(12) United States Patent
Leach (10) Patent No.: US 9,635,956 B1
(45) Date of Patent: May 2, 2017

(54) INFANT CARRIER ACCESSORY COMPRISING ARM CUSHION AND CANOPY

(71) Applicant: Jamie S. Leach, Ada, OK (US)

(72) Inventor: Jamie S. Leach, Ada, OK (US)

( * ) Notice: Subject to any disclaimer, the term of this patent is extended or adjusted under 35 U.S.C. 154(b) by 12 days.

(21) Appl. No.: 14/303,214

(22) Filed: Jun. 12, 2014

(51) Int. Cl.
| A47D 13/02 | (2006.01) |
|---|---|
| B60N 2/28 | (2006.01) |
| A47C 7/66 | (2006.01) |
| A47D 15/00 | (2006.01) |

(52) U.S. Cl.
CPC .............. *A47D 15/00* (2013.01); *A47C 7/66* (2013.01); *A47D 13/025* (2013.01); *B60N 2/2845* (2013.01)

(58) Field of Classification Search
CPC ........................................ A47D 15/00
USPC ........................................ 297/183.6
See application file for complete search history.

(56) References Cited

U.S. PATENT DOCUMENTS

| 4,834,459 | A |   | 5/1989 | Leach |  |
|---|---|---|---|---|---|
| 4,861,109 | A |   | 8/1989 | Leach |  |
| D309,018 | S |   | 7/1990 | Leach |  |
| 4,978,166 | A | * | 12/1990 | James | 297/184.17 |
| 5,103,514 | A |   | 4/1992 | Leach |  |
| 5,325,818 | A |   | 7/1994 | Leach |  |
| 5,730,490 | A | * | 3/1998 | Mortenson | 297/184.13 |
| 6,343,727 | B1 |   | 2/2002 | Leach |  |
| 6,427,251 | B1 |   | 8/2002 | Leach |  |
| 6,499,164 | B1 |   | 12/2002 | Leach |  |
| 6,517,153 | B1 | * | 2/2003 | Brewer | 297/184.13 |
| 6,553,590 | B1 |   | 4/2003 | Leach |  |
| 6,601,252 | B1 |   | 8/2003 | Leach |  |
| 6,751,817 | B1 |   | 6/2004 | Leach |  |
| 6,760,934 | B1 |   | 7/2004 | Leach |  |
| 7,010,821 | B1 |   | 3/2006 | Leach |  |
| 7,114,206 | B2 |   | 10/2006 | Leach |  |

(Continued)

OTHER PUBLICATIONS

Sprout Shell, "Sprout Shell Chic Infant Carrier Covers," [online] web page retrieved from http://sproutshell.com/product/golden-mountains/, Kaysville, UT. The first publication date of this reference is unknown. This document was published prior to the effective filing date of the instant application, namely, Jun. 12, 2014, and prior to any foreign priority date of the present application. [retrieved on Mar. 24, 2014].

(Continued)

*Primary Examiner* — Timothy J Brindley
(74) *Attorney, Agent, or Firm* — Mary M. Lee (57) ABSTRACT

An accessory for an infant carrier. The accessory includes a padded sleeve that serves as an arm cushion. A canopy, stowable in the sleeve, can be fully or partly deployed to cover all or half of the carrier. The canopy has a central opening that permits the caregiver to insert her forearm under the handle when the canopy is deployed. The opening in the canopy also permits the caregiver to see inside the carrier under the deployed canopy and to reach inside with a bottle or toy for the baby. When the canopy is fully deployed, it covers the top and bottom half of the carrier with the handle spanning the central opening. In this position, the sleeve can be rotated on the handle to partially furl or unfurl either side of the canopy around the sleeve to open or close the opening over either half of the carrier.

18 Claims, 10 Drawing Sheets

(56) References Cited

U.S. PATENT DOCUMENTS

| | | |
|---|---|---|
| 7,353,552 B2 | 4/2008 | Leach |
| 7,500,278 B2 | 3/2009 | Leach |
| 7,513,001 B1 | 4/2009 | Leach |
| 7,562,406 B1 | 7/2009 | Leach |
| 7,676,871 B1 | 3/2010 | Leach |
| 7,708,342 B2 | 5/2010 | Leach |
| 7,793,371 B1 | 9/2010 | Leach |
| 7,878,587 B1 | 2/2011 | Leach |
| 7,926,135 B1 | 4/2011 | Leach |
| 8,136,186 B1 | 3/2012 | Leach |
| 8,146,760 B1 | 4/2012 | Leach |
| 8,182,033 B2 * | 5/2012 | Hei et al. .................. 297/183.6 |
| D667,241 S | 9/2012 | Winnail |
| 8,419,128 B1 | 4/2013 | Leach |
| 8,448,275 B1 | 5/2013 | Leach |
| 8,468,627 B2 | 6/2013 | Leach |
| 8,479,334 B1 | 7/2013 | Leach |
| 8,555,429 B2 | 10/2013 | Leach |
| 8,661,587 B1 | 3/2014 | Leach |
| 8,661,588 B1 | 3/2014 | Leach |
| 8,671,480 B1 | 3/2014 | Leach |
| 2005/0278864 A1 | 12/2005 | Leach |
| 2007/0022526 A1 | 2/2007 | Leach |
| 2007/0028384 A1 | 2/2007 | Leach |
| 2007/0046084 A1 | 3/2007 | Leach |
| 2007/0151031 A1 | 7/2007 | Leach |
| 2007/0277321 A1 | 12/2007 | Leach |
| 2010/0109391 A1 * | 5/2010 | Berry ...................... 297/184.13 |
| 2012/0062001 A1 * | 3/2012 | Krasley ................... 297/184.13 |
| 2012/0256452 A1 * | 10/2012 | Berry ...................... 297/184.13 |
| 2012/0286547 A1 * | 11/2012 | Gibbons et al. ......... 297/184.11 |
| 2013/0082490 A1 * | 4/2013 | Tew ........................... 297/183.6 |
| 2014/0021751 A1 * | 1/2014 | Lang et al. .............. 297/184.13 |
| 2015/0183352 A1 * | 7/2015 | Bowe ...................... 297/184.13 |

OTHER PUBLICATIONS

Summer Infant Inc., "2-In-1 Carry & Cover (Dots)," [online] web page retrieved from http://www.summerinfant.com/2in1carrycoverdots, Woonsocket, RI. The first publication date of this reference is unknown. This document was published prior to the effective filing date of the instant application, namely, Jun. 6, 2014, and prior to any foreign priority date of the present application. [retrieved on Mar. 3, 2014].

The Boppy Company, "Boppy Infant Seat Handle Cushion," [online] web page retrieved from http:www.boppy.com/shop/boppy-infant-seat-handle-cushion/, Golden, CO. The first publication date of this reference is unknown. This document was published prior to the effective filing date of the instant application, namely, Jun. 12, 2014, and prior to any foreign priority date of the present application. [retrieved on May 29, 2014].

Quintessential Tots, LLC, "Itzy Ritzy Ritzy Wrap Infant Car Seat Handle Cushion," [online] web page retrieved from http:www.itzyritzystore.com/products/ritzy-wrap-infant-car-seat-handle-cushions/ritzy-wrap-infant-car-seat-handle-cushion-RW8058, Naperville, IL. This document was published prior to the effective filing date of the instant application, namely, Jun. 12, 2014, and prior to any foreign priority date of the present application. [retrieved on May 29, 2014].

Lily's Loving Arms, LLC, "Padalily the Stylish Handle Cushion," [online] web page retrieved from http://www.padalily.com/default.asp, Waxhaw, NC. This document was published prior to the effective filing date of the instant application, namely Jun. 12, 2014, and prior to any foreign priority date of the present application. [retrieved on May 29, 2014].

* cited by examiner

INFANT CARRIER ACCESSORY COMPRISING ARM CUSHION AND CANOPY

FIELD OF THE INVENTION

The present invention relates generally to infant carrier accessories and more specifically, but without limitation, to carrier covers and handle cushions.

DETAILED DESCRIPTION OF THE PREFERRED EMBODIMENT(S)

Figure 1:
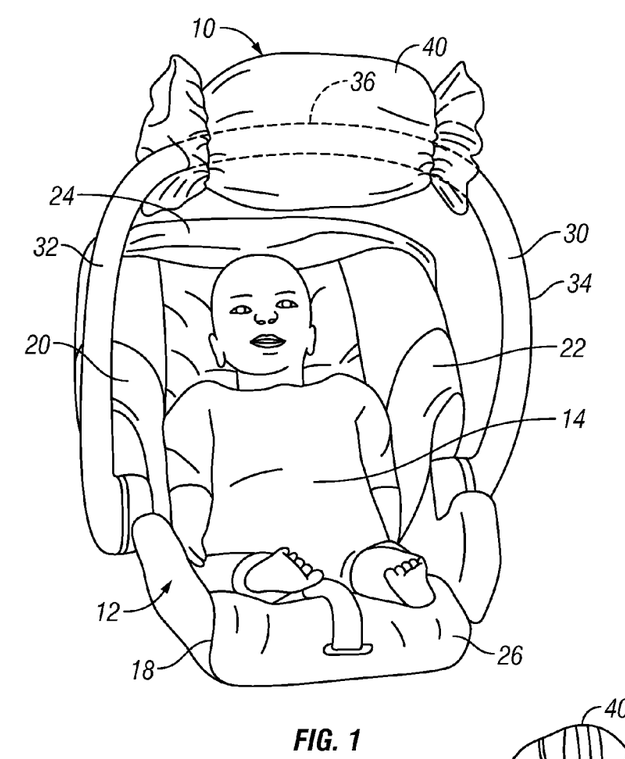
FIG. 1 is a frontal perspective view of an infant carrier equipped with an accessory constructed in accordance with a preferred embodiment of the present invention.
Figure 2:
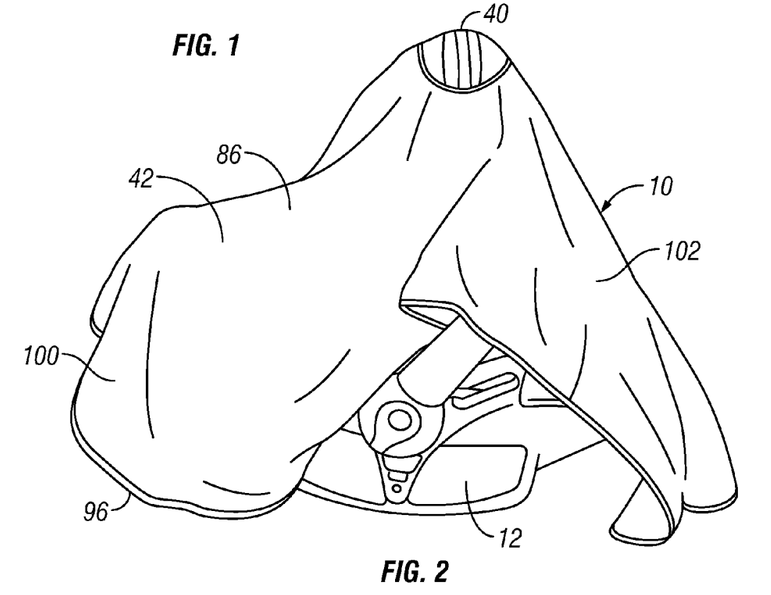
FIG. 2 shows the canopy of the accessory in the fully deployed position.

Turning now to the drawings in general and to FIGS. 1 and 2 in particular, there is shown therein an accessory for an infant carrier made in accordance with a preferred embodiment of the present invention. The accessory, designated generally by the reference numeral 10, is designed for use with any infant carrier, as exemplified by the carrier 12.

As used herein, "infant carrier" generally denotes a seat for supporting an infant 14 in a reclining position and which is typically used as a car seat as well as a carrier. A typical infant carrier 12 includes a basket or seat bucket 18 for holding the infant 14. The infant seat bucket 18 is generally oblong in shape, has sides 20 and 22, a head or top portion 24, and a foot or bottom portion 26. A U-shaped handle 30 having side portions 32 and 34 converging at an apex 36 is attached at about the center of the seat bucket 18 at each side 20 and 22. In this way, the handle 30 arches over the seat bucket 18. The handle 30 may be pivotally attached. FIG. 1 illustrates the accessory 10 attached lengthwise to the apex 36 of the handle 30.

The accessory 10 comprises a combination arm cushion and canopy or cover for the carrier 12. As shown in FIG. 1, the arm cushion takes the form of an elongate padded sleeve 40 that is removably and rotably attachable lengthwise to the apex 36 of the carrier handle 30. In the non-deployed mode shown in FIG. 1, the canopy is stowed in or on the sleeve 40. Then, when desired, the canopy 42 can be unfurled into a fully deployed position covering the carrier 12, as seen FIG. 2. Depending on the specific construction of the accessory, the canopy 42 may extend over the sides 20 and 22 of the handle 30, as shown in FIG. 2, or alternately the canopy may pass under the handle.

Figure 3:
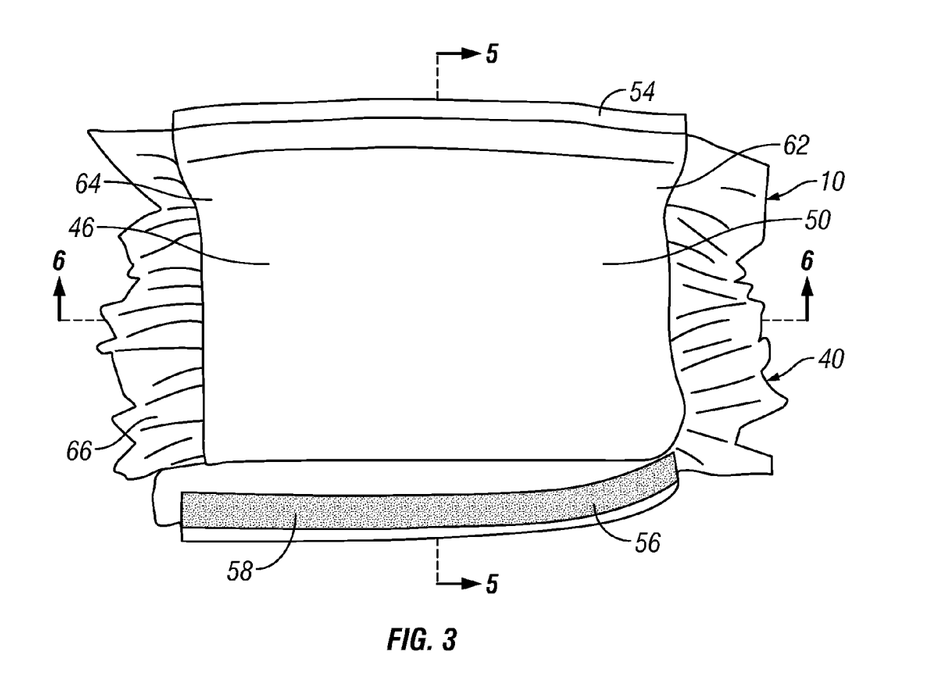
FIG. 3 is a bottom view of the infant care accessory in the open position.
Figure 4:
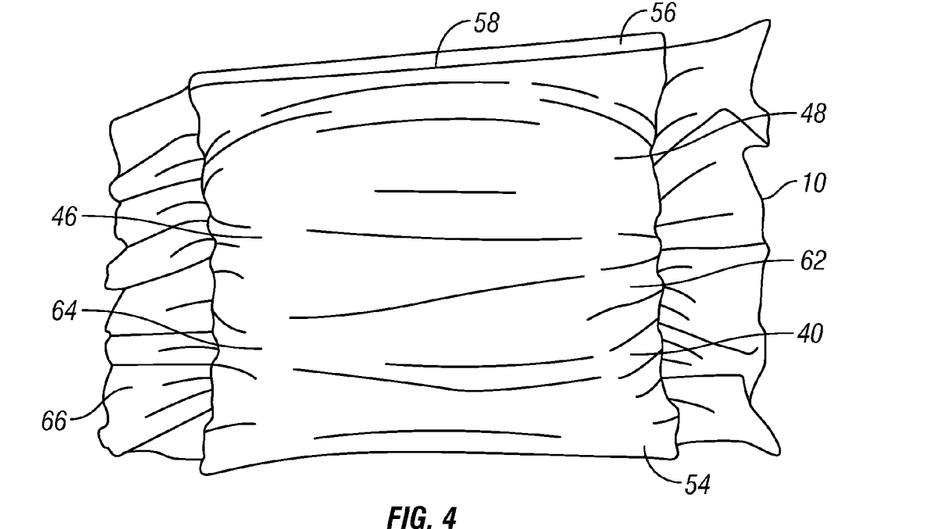
FIG. 4 is a plan view of the infant care accessory in the open position.
Figure 5:
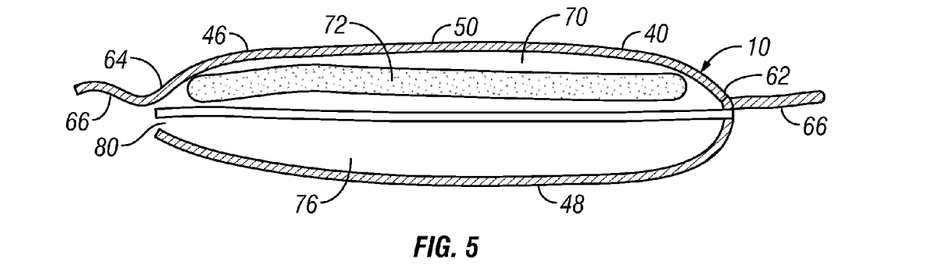
FIG. 5 is a sectional view taken along the line 5-5 in FIG. 3.
Figure 6:
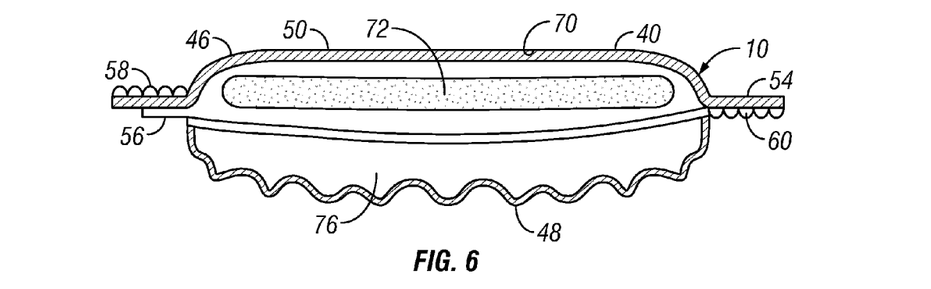
FIG. 6 is a sectional view taken along the line 6-6 in FIG. 3.

Turning to FIGS. 3-7, a preferred construction of the sleeve 40 will be described. The sleeve 40 preferably comprises a generally rectangular body portion 46 with an outer surface 48 (FIG. 4) and an inner surface 50 (FIG. 3). First and second attachment flanges 54 and 56 are provided on opposing sides of the body portion 46. In this way, when the body portion 46 is curled into a roll and the flanges 54 and 56 are attached to each other, the body forms a sleeve that is sized to fit on the carrier handle 30. Most conveniently, the first and second attachment flanges 54 and 56 comprise strips of mating hook-and-loop fastener 58 and 60 (FIG. 6). However, it will be appreciated that many other forms of attachment may be utilized, including but not limited to a zipper, buttons, snaps, ties, and hooks. The non-attachment sides 62 and 64, which form the ends of the sleeve, may be provided with a decorative edging such as the ruffles 66 shown.

The internal structure of the sleeve 40 is shown in FIGS. 5 and 6. As indicated, the sleeve 40 is padded in order to cushion the forearm of a user carrying the carrier by the handle 30. Padding may be incorporated into the sleeve is various ways. In the embodiment shown and described herein, the sleeve 40 comprises a pad compartment 70 that contains padding, such as the block of 1-inch foam 72. Other exemplary forms of padding include loose filler and an inflatable bladder.

In a most preferred embodiment, the canopy 42 is stowed inside the sleeve 40 when in the non-deployed or stowed position. To that end, the sleeve 40 comprises a canopy compartment 76 sized to receive the canopy 42 in a folded or rolled form. In FIGS. 5 and 6, the canopy 42 is omitted to simplify the illustration. When stored in this compartment, the folded canopy 42 adds to the padding afforded by the accessory 10. These compartments 70 and 76 may be conveniently provided by stitching together three layers of fabric at or near the edges. Thus, the pad compartment 70 and the canopy compartment 76 are generally coextensive.

Figure 7:
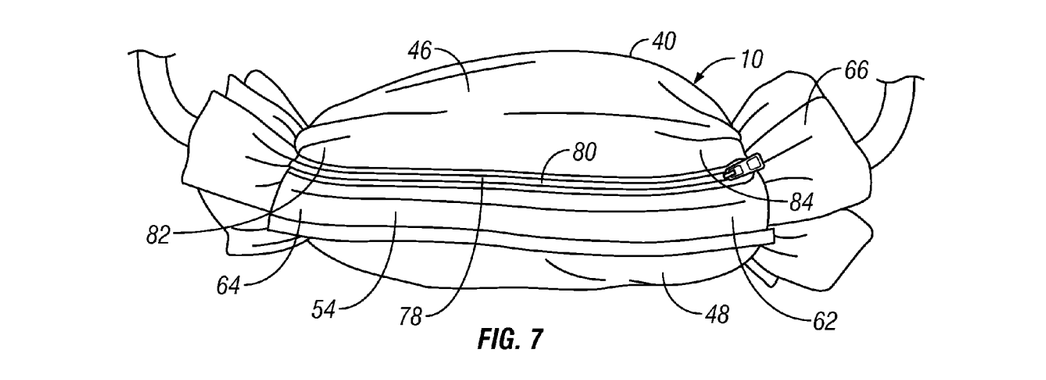
FIG. 7 is a plan view of the accessory with the sleeve positioned on the handle of the infant carrier and showing the overlapping attachment flanges and the zippered opening of the canopy compartment.

Referring now to FIG. 7, access to the canopy compartment 76 is provided by including in the sleeve body 46 an opening 80. Preferably, the opening 80 is elongate having first and second ends 82 and 84 at longitudinally spaced apart points on the sleeve body 46 and is arranged longitudinally on the sleeve body. The opening 80 is conveniently positioned adjacent to one of the opposing attachment flanges 54 and 56, such as the flange 54, on the outer surface 48. Preferably, the opening 80 includes some closure means. In the embodiment shown, the closure means is a zipper 78. However, other closure devices, such as ties, snaps, hook-and-loop fasteners, buttons, hooks, and the like, may be used instead.

Figure 8:
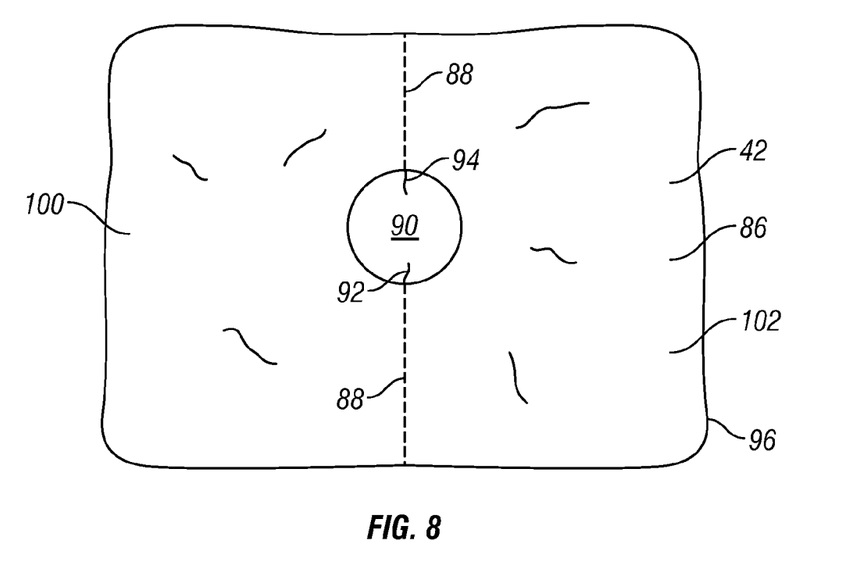
FIG. 8 is a plan view of the canopy in a flat open position. The sleeve is removed to simplify the illustration.
Figure 9:
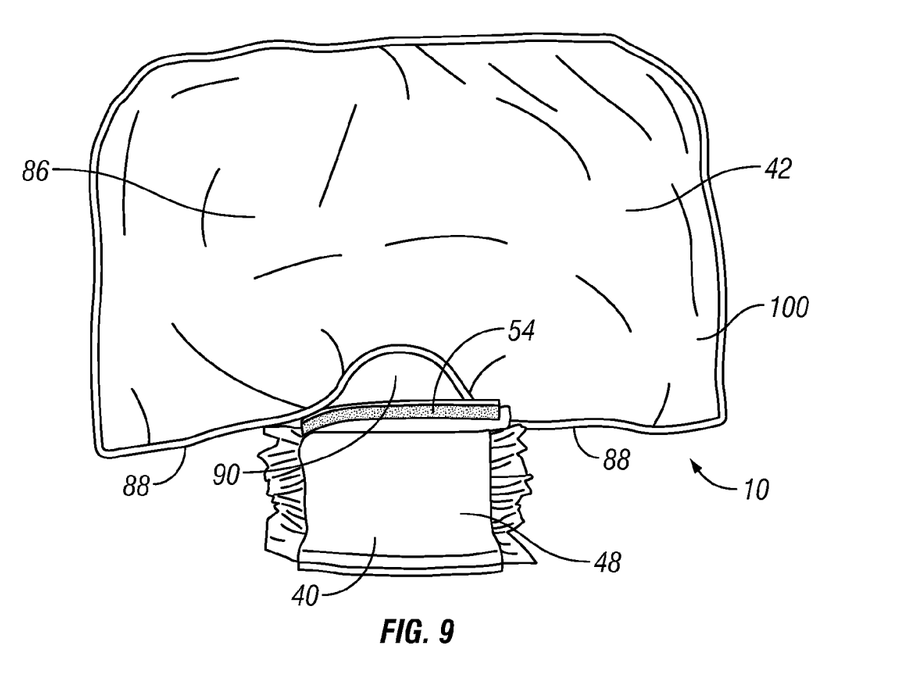
FIG. 9 is a plan view of the accessory with the canopy folded in half and showing the attachment points to the sleeve.

With reference now to FIGS. 8 and 9, the canopy 42 will be described. The canopy 42 comprises a panel of fabric 86, which may be rectangular, oval, circular, or any shape that accommodates the size and shape of the carrier 12. In the preferred embodiment, two sheets of fabric are stitched together to form the unitary panel 86, as best seen in FIG. 8, the seams indicated at 88. As used herein, "unitary" refers to the finished canopy as comprising a single panel. Alternately, the canopy 42 may comprise two or more panels of fabric that together cooperate to cover the carrier 12.

As shown in FIG. 8, the fabric panel 86 includes a central opening 90. As used herein, the term "central" denotes that the opening is only generally centered in the panel. In the embodiment shown, the opening 90 is a circular opening about 10-12 inches in diameter, but the opening may vary in both size and shape.

The canopy opening 90 has diametrically opposed first and second attachment points 92 and 94. In this embodiment, the attachment points comprise short fabric tabs. The attachment points 92 and 94 are attached to longitudinally spaced apart points on the sleeve 40, as shown in FIG. 9. It is convenient, though not essential, to attach the tabs 92 and 94 to the first and second ends 82 and 84 of the compartment opening 80. More preferably, the tabs 92 and 94 may be attached just inside the ends 82 and 84 of the opening 80. This attachment may be releasable; however, most preferably, the attachment is permanent, as by stitching the tabs 92 and 94 into one of the seams of the sleeve body 46.

Figure 10:
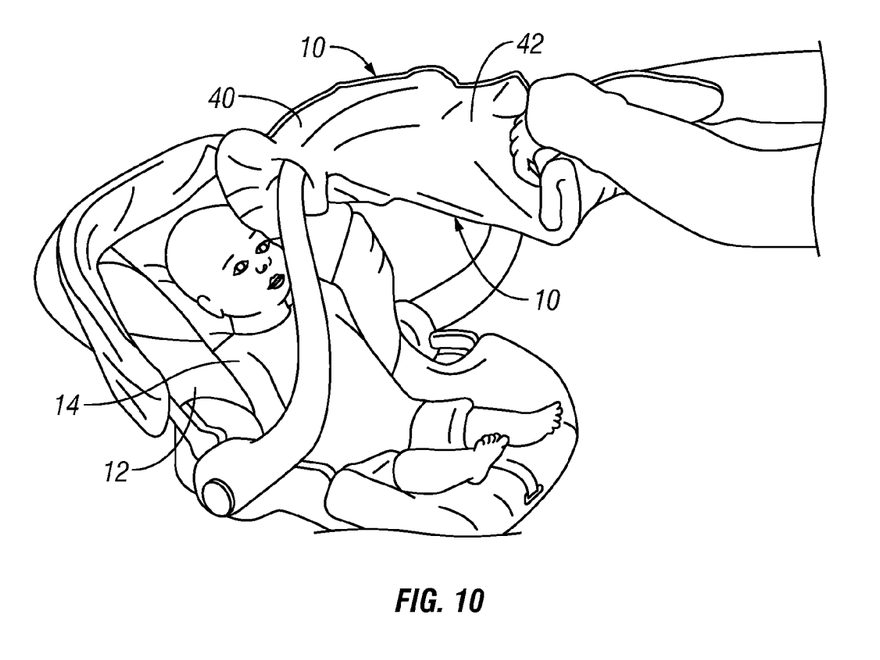
FIGS. 10-12 illustrate how the canopy is removed from the sleeve and unfurled.
Figure 11:
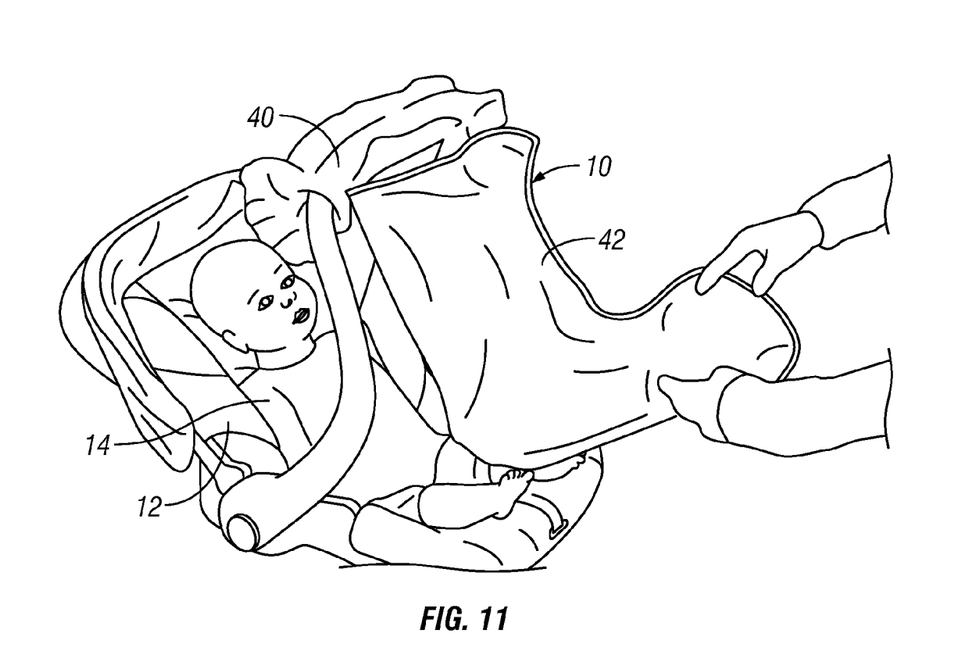
Figure 12:
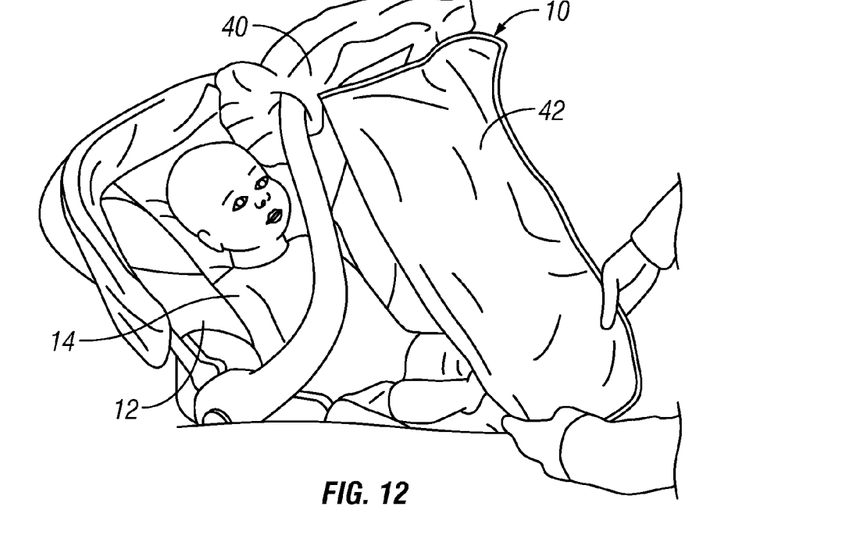

FIGS. 10-12 illustrate the unfurling of the canopy 42 from the canopy compartment 76 (FIGS. 5&6). Once unfurled, the canopy 42 may be opened out and positioned over the carrier 12 in the fully deployed position shown in FIG. 2. In this position, the fabric panel 86 covers the seat bucket 18, including both the top and bottom portions 24 and 26. The peripheral edge 96 (FIG. 2) of the panel 86 may be provided with elastic or some other feature that allows the edge to be secured to the seat bucket 18.

Figure 13:
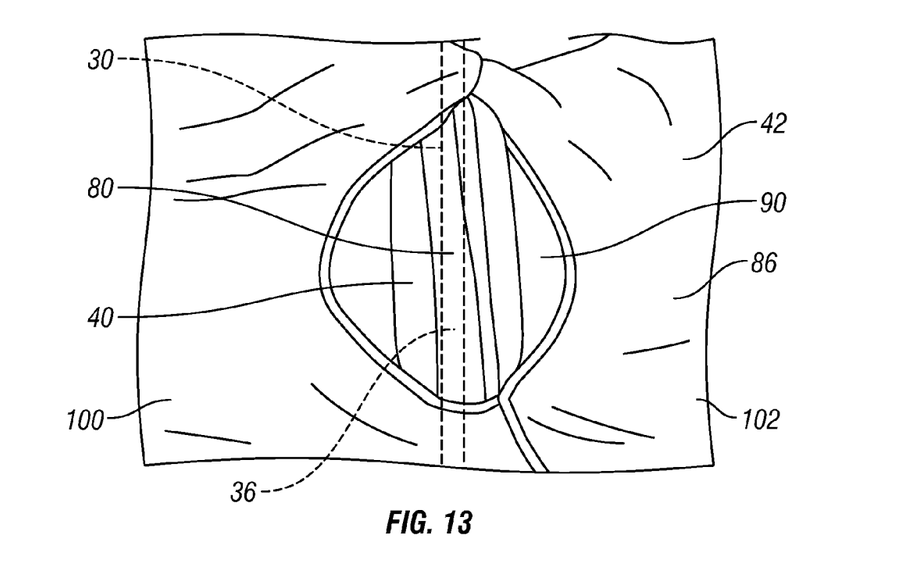
FIG. 13 is an enlarged plan view of the accessory with the canopy in the deployed position and illustrating how the sleeved handle bisects the opening in the canopy.

As shown in FIG. 13, in this position, the central opening 90 of the canopy 42 is approximately bisected by the apex 36 of the carrier handle 30. In this way, a first portion 100 of the canopy 42 extends over the top half 24 of the seat bucket 18 and a second portion 102 of the canopy extends over the bottom half 26 of the seat bucket. See also FIG. 2.

Figure 14:
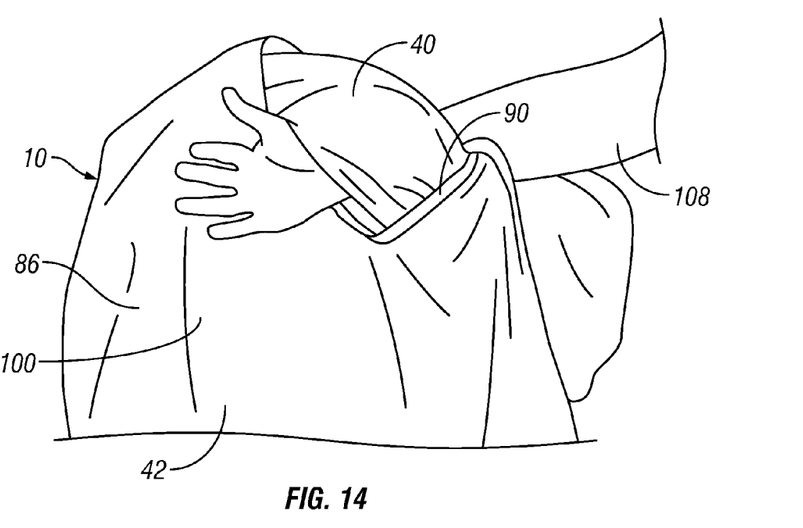
FIG. 14 illustrates how the central opening permits the carrier to be carried on the forearm of a caregiver even when the canopy is in the deployed position.
Figure 15:
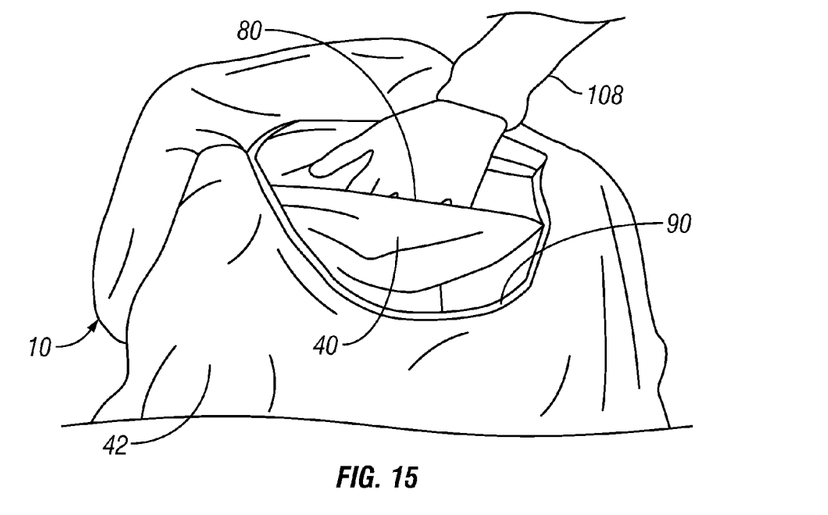
FIG. 15 shows how the central opening permits the canopy compartment to be accessed when the canopy is in the deployed position.

Additionally, as shown in FIG. 14, the central opening 90 is sized to permit the forearm of an adult caregiver 108 to extend through the central opening under the sleeved handle 30 in a typical carry position. Still further, as shown in FIG. 15, with the canopy 42 deployed, the canopy compartment 76 (FIGS. 5&6) can be readily accessed by the caregiver 108 to store and retrieve various items, such as pacifiers, keys, cell phones, and more.

Figure 16:
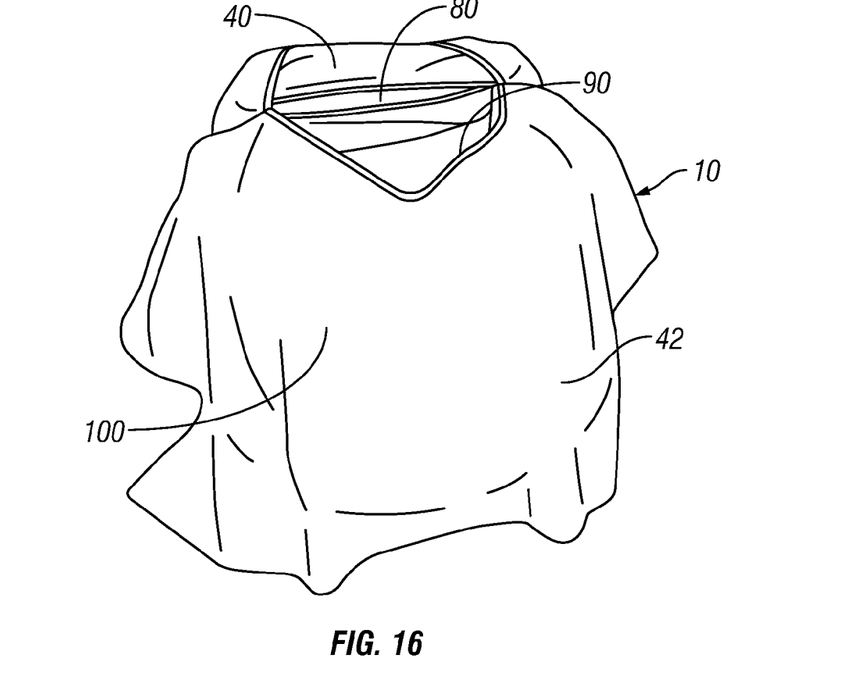
FIG. 16 is a front perspective view of the canopy in the fully deployed position and shows how the central opening allows the baby in the carrier to be viewed through the deployed canopy.
Figure 17:
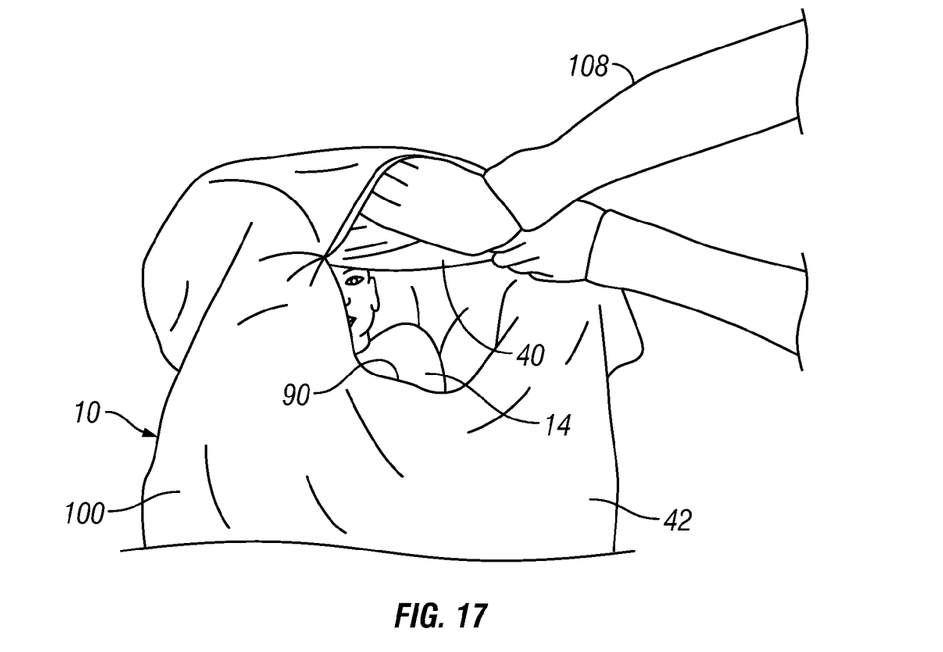
FIG. 17 is a front elevational view of the canopy in the fully deployed position and shows how rotation of the sleeve on the carrier handle adjusts the size of the central opening.

Turning now to FIGS. 16 and 17, yet another feature of the accessory 10 will be explained. Because the central opening 90 extends out on both sides of the sleeve 40 and carrier handle 30, the caregiver 108 has visual access to the baby 14 inside. Now it will be understood that, because the sleeve 40 is rotatably attached to the carrier handle 30, the sleeve can be rotated towards the top portion 24 or alternately towards the bottom portion 26 of the carrier seat bucket 18. This will partially furl either the first portion 100 or the second portion 102 of the canopy 42 around the sleeve 40 so that the central opening 90 is reduced or obscured over either the top or bottom halves 24 and 26 of the seat bucket 18.

Figure 18:
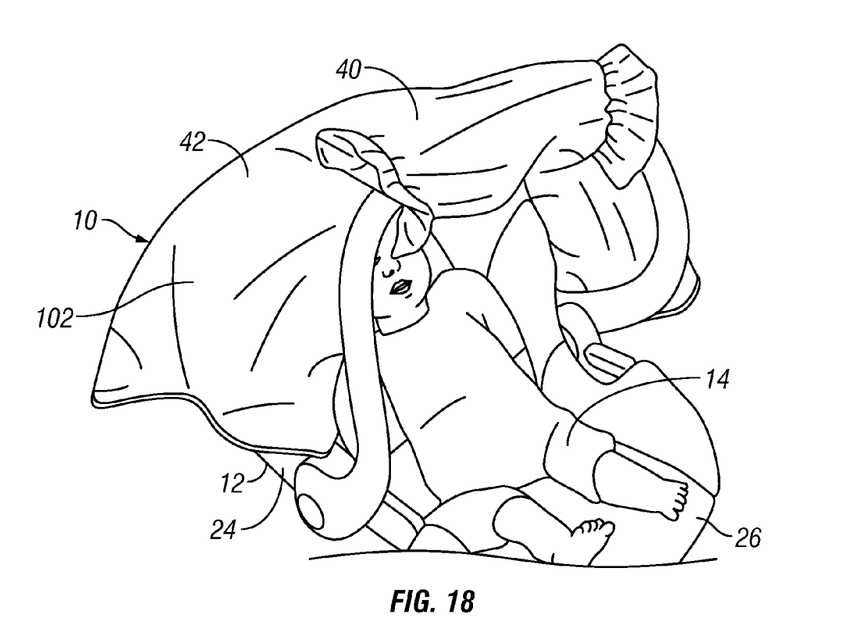
FIG. 18 shows a frontal perspective view of the carrier with the canopy in a partially deployed position covering only the top half of the seat bucket.
Figure 19:
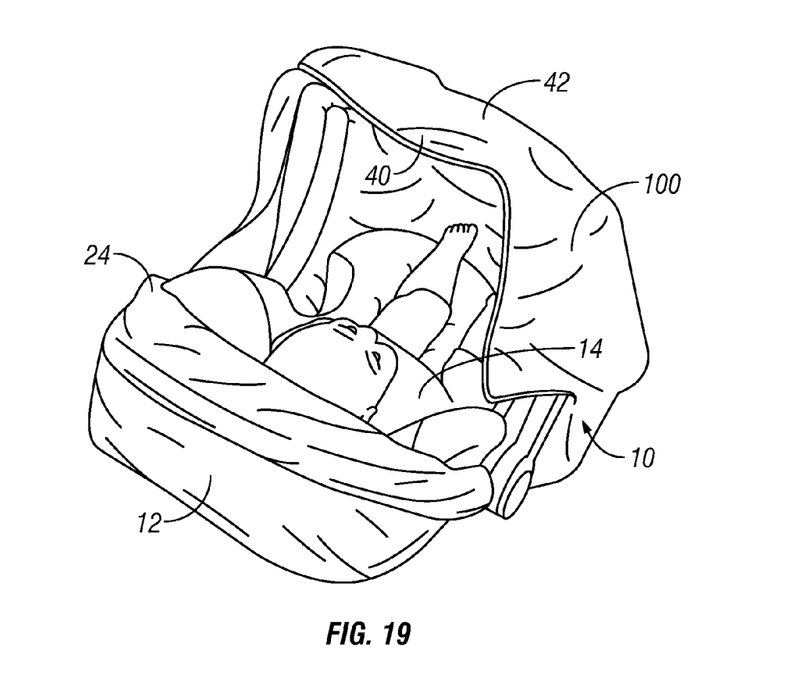
FIG. 19 shows a rear perspective view of the carrier with the canopy in a partially deployed position covering only the bottom half of the seat bucket.

FIGS. 18 and 19 show two partially deployed positions for the canopy 42. In FIG. 18, the canopy 42 is positioned in a first partially deployed position by extending both the first and second portions 100 and 102 of the canopy over the top half 24 of the seat bucket 18, and so that the bottom half 26 of the seat bucket is uncovered. In FIG. 19, the canopy 42 is positioned in a second partially deployed position by extending both the first and second portions 100 and 103 of the canopy over the bottom half 26 of the seat bucket 18, and so that the top half 24 of the seat bucket is uncovered.

Figure 20:
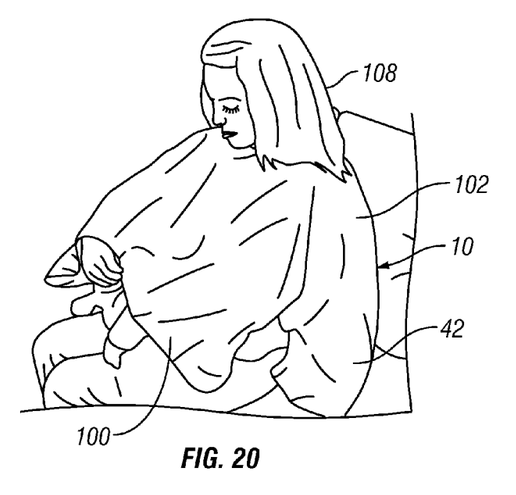
FIG. 20 shows a caregiver using the inventive accessory as a nursing cover-up. In this position, the central opening is placed over the caregiver's head.
Figure 21:
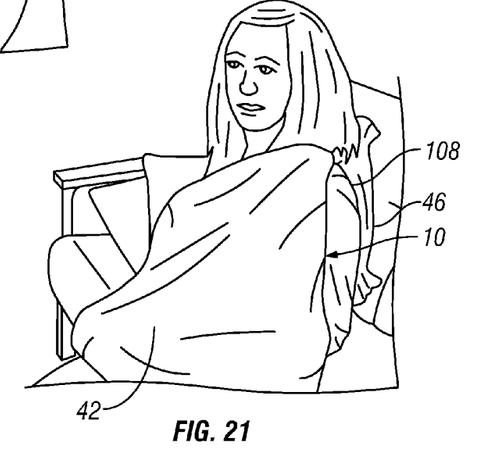
FIGS. 21 and 22 show another style of wearing the accessory as a nursing cover-up with the canopy folded in half, one arm through the central opening, and the opened sleeve positioned as a back cushion.
Figure 22:
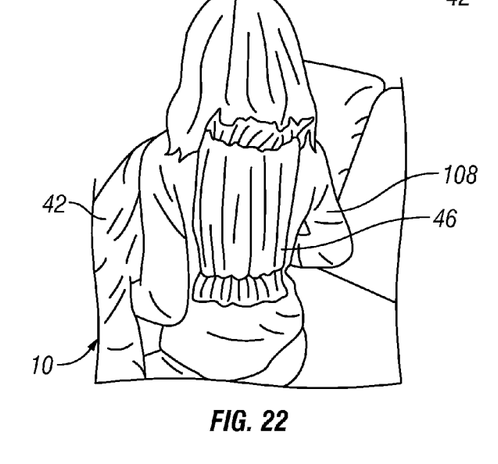

FIGS. 21-22 illustrate the use of the accessory 10 as a nursing cover. The size of the central opening 90 in the canopy 42 is large enough to easily accommodate the head of the caregiver 108, so the canopy 42 can be worn for modesty while breastfeeding. As shown in FIG. 20, one half 100 of the canopy 42 is spread out over the caregiver's lap, while the other half 102 drapes across her back. The flattened sleeve body 46 (not seen in this figure) can be positioned horizontally across the user's upper back under the back half 102 of the canopy 42.

Alternately, as seen in FIGS. 21 and 22, the caregiver 108 may fold the canopy 42 in half (FIG. 9) and slip one arm through the opening 90. This positions the flattened sleeve body 46 vertically at the caregiver's upper back (FIG. 22).

The construction of the accessory 10 is well within the skill of most commercial sewers. It will be apparent that the choice of fabric for the accessory is almost limitless, although colorful child-themed patterns will be preferred. The canopy 42 may be reversible, as both sides of the fabric panel 86 are exposed during use. In some instances, it may be desirable to use a water-proof or water-resistant fabric, or fabric treatment, for the accessory.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An accessory for an infant carrier, the infant carrier comprising a seat bucket and an over-arching handle dividing the seat bucket into a top half and a bottom half, the accessory comprising:
   an elongate padded sleeve removably and rotatably attachable lengthwise to the apex of the carrier handle; and
   a canopy comprising a fabric panel sized to cover the infant carrier, the canopy including a central opening with diametrically opposed first and second attachment points;
   wherein, when the accessory is attached to the carrier handle, the canopy is movable between a stowed position in or on the sleeve and a fully deployed position, wherein in the fully deployed position, the first and second attachment points of the canopy opening are attached to longitudinally spaced apart points on the sleeve, the fabric panel covers the seat bucket, and the central opening of the panel is approximately bisected by the handle so that a first portion of the canopy extends over the top half of the seat bucket and a second portion of the canopy extends over the bottom half of the seat bucket; and
   wherein, when the accessory is attached to the carrier handle and the canopy is in the fully deployed position, the central opening is sized to permit the forearm of an adult user to extend through the central opening under the handle in a carry position.

2. The accessory of claim 1 wherein the sleeve comprises a canopy compartment and wherein the canopy is contained in the compartment when the canopy is in the stowed position.

3. The accessory of claim 2 wherein the canopy compartment includes an elongate opening arranged longitudinally on the sleeve and having first and second ends that are longitudinally spaced apart points on the sleeve and wherein the first and second attachment points of the canopy opening are attached to first and second ends of the compartment opening.

4. The accessory of claim 3 wherein the first and second attachment points of the canopy opening are permanently attached to first and second ends of the compartment opening.

5. The accessory of claim 1 wherein the sleeve comprises a rectangular body portion having first and second opposing attachment flanges removably attachable to each other to form the body into a sleeve.

6. The accessory of claim 5 wherein the sleeve body comprises a pad compartment and canopy compartment formed by three layers of fabric joined at or near the edges, wherein the pad compartment contains padding and wherein the canopy compartment is sized to receive the canopy in the stowed position.

7. The accessory of claim 6 wherein the pad compartment and the canopy compartment are generally coextensive.

8. The accessory of claim 7 wherein the canopy compartment includes an elongate opening arranged longitudinally on the sleeve adjacent to one of the opposing attachment flanges.

9. The accessory of claim 8 wherein the first and second attachment flanges comprise strips of mating hook-and-loop fastener.

10. The accessory of claim 1 wherein the central opening in the fabric panel is circular.

11. The accessory of claim 10 wherein the central opening has a diameter of about 10-12 inches.

12. The accessory of claim 1 wherein when the canopy is in the fully deployed position the canopy cover extends over the sides of the handle.

13. The accessory of claim 1 wherein the fabric panel is a unitary piece of fabric.

14. The accessory of claim 1 wherein the sleeve comprises a canopy compartment, wherein the canopy is contained in the compartment when the canopy is in the stowed position, wherein the sleeve has an outer surface that is exposed when the sleeve is positioned on the handle, wherein the canopy compartment includes an elongate opening arranged longitudinally on the outer surface of the sleeve, and wherein the canopy and sleeve are configured so that the elongate canopy compartment opening is accessible when the sleeve is attached to the handle and the canopy is either in the stowed position or the fully deployed position.

15. A method for covering an infant carrier, the infant carrier comprising a seat bucket and an over-arching handle dividing the seat bucket into a top half and a bottom half, the method comprising:
   positioning an accessory on the infant carrier, wherein the accessory comprises:
      an elongate padded sleeve removably and rotatably attachable lengthwise to the apex of the carrier handle; and
      a canopy comprising a fabric panel sized to cover the infant carrier, the canopy including a central opening with diametrically opposed first and second attachment points;
      wherein, when the accessory is attached to the carrier handle, the canopy is movable between a stowed position in or on the sleeve and a fully deployed position, wherein in the fully deployed position, the first and second attachment points of the canopy opening are attached to longitudinally spaced apart points on the sleeve, the fabric panel covers the seat bucket, and the central opening of the panel is approximately bisected by the handle so that a first portion of the canopy extends over the top half of the seat bucket and a second portion of the canopy extends over the bottom half of the seat bucket; and
      wherein, when the accessory is attached to the carrier handle and the canopy is in the fully deployed position, the central opening is sized to permit the forearm of an adult user to extend through the central opening under the sleeved handle in a carry position; and
   positioning the canopy in the fully deployed position;
   rotating the sleeve while the canopy is in the fully deployed position to partially furl either the first portion or the second portion of the canopy around the sleeve so that the central opening is obscured over either the top or bottom half of the seat bucket.

16. The method of claim 15 further comprising:
   positioning the canopy in a first partially deployed position by extending both the first and second portions of the canopy over the top half of the seat bucket, so that the bottom half of the seat bucket is uncovered.

17. The method of claim 16 further comprising:
   positioning the canopy in a second partially deployed position by extending both the first and second portions of the canopy over the bottom half of the seat bucket, so that the top half of the seat bucket is uncovered.

18. The method of claim 15 further comprising:
   positioning the canopy in a second partially deployed position by extending both the first and second portions of the canopy over the bottom half of the seat bucket, so that the top half of the seat bucket is uncovered.

* * * * *

UNITED STATES PATENT AND TRADEMARK OFFICE
CERTIFICATE OF CORRECTION

PATENT NO. : 9,635,956 B1  
APPLICATION NO. : 14/303214  
DATED : May 2, 2017  
INVENTOR(S) : Jamie S. Leach Page 1 of 1

It is certified that error appears in the above-identified patent and that said Letters Patent is hereby corrected as shown below:

On the Title Page

Page 2, Column 2, Item (56) References Cited Other Publications:  
Line 5: replace "Jun. 6, 2014" with --Jun. 12, 2014--.  
Line 7: replace "Mar. 3, 2014" with --Mar. 24, 2014--.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*